United States Patent
Ueda et al.

(10) Patent No.: US 10,613,240 B2
(45) Date of Patent: Apr. 7, 2020

(54) SEISMIC SENSOR AND THRESHOLD ADJUSTING METHOD

(71) Applicant: OMRON Corporation, Kyoto-shi, Kyoto (JP)

(72) Inventors: Naotsugu Ueda, Kusatsu (JP); Hiroyuki Mino, Osaka (JP); Yoshitaka Tsurukame, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 515 days.

(21) Appl. No.: 15/196,230

(22) Filed: Jun. 29, 2016

(65) Prior Publication Data

US 2017/0003406 A1    Jan. 5, 2017

(30) Foreign Application Priority Data

Jul. 2, 2015   (JP) .................................. 2015-133850

(51) Int. Cl.
*G01V 1/18*   (2006.01)
*G01V 1/16*   (2006.01)
*G01V 1/00*   (2006.01)

(52) U.S. Cl.
CPC .............. *G01V 1/162* (2013.01); *G01V 1/008* (2013.01); *G01V 2210/1232* (2013.01)

(58) Field of Classification Search
None
See application file for complete search history.

(56) References Cited

U.S. PATENT DOCUMENTS 3,990,039 A * 11/1976 Miller ...................... G01V 1/16
181/122
4,505,014 A *  3/1985 McNeel .................. G01P 1/023
29/25.35

(Continued)

FOREIGN PATENT DOCUMENTS

CA    2170561 A1 *  8/1997    ............. G01V 1/008
EP    2944979 A1    11/2015

(Continued)

OTHER PUBLICATIONS

Amditis, A., et al. "An overview of MEMSCON project: An intelligent wireless sensor network for after-earthquake evaluation of concrete buildings.";Proc. 14th Eur. Conf. Earthquake Eng. 2010. (Year: 2010).*

(Continued)

*Primary Examiner* — Isam A Alsomiri
*Assistant Examiner* — Jonathan D Armstrong
(74) *Attorney, Agent, or Firm* — Metrolex IP Law Group, PLLC

(57) ABSTRACT

Power consumption of a seismic sensor is suppressed. The seismic sensor is operated in a power-saving mode and a measuring mode in which the power consumption is larger than that of the power-saving mode. The seismic sensor includes: a measuring part configured to measure an acceleration; an index calculator configured to transition from the power-saving mode to the measuring mode to calculate an index value indicating a size of an earthquake when the acceleration measured with the measuring part exceeds a first threshold; and a threshold adjuster configured to change the first threshold so as to increase the first threshold relative to a predetermined reference value when a tendency of the acceleration measured with the measuring part satisfies a predetermined condition.

8 Claims, 4 Drawing Sheets

(56) References Cited

U.S. PATENT DOCUMENTS

| | | | | |
|---|---|---|---|---|
| 5,353,644 | A * | 10/1994 | Frank | G01B 21/30 |
| | | | | 73/509 |
| 5,563,575 | A * | 10/1996 | Yamamura | B60Q 1/44 |
| | | | | 200/61.45 R |
| 5,673,365 | A * | 9/1997 | Basehore | A47L 9/2805 |
| | | | | 180/282 |
| 6,038,924 | A * | 3/2000 | Lee | G01P 15/09 |
| | | | | 310/329 |
| 6,466,923 | B1 * | 10/2002 | Young | G06F 19/24 |
| | | | | 382/103 |
| 6,731,220 | B2 * | 5/2004 | Chen | G01V 1/008 |
| | | | | 340/540 |
| 6,937,941 | B2 * | 8/2005 | Hala | G01H 1/003 |
| | | | | 341/122 |
| 7,522,639 | B1 * | 4/2009 | Katz | G01D 4/002 |
| | | | | 340/870.02 |
| 7,650,269 | B2 * | 1/2010 | Rodney | G01V 1/48 |
| | | | | 703/10 |
| 7,668,692 | B2 * | 2/2010 | Tatom | G01G 19/022 |
| | | | | 702/173 |
| 8,760,087 | B2 * | 6/2014 | Schulz | F16C 32/0457 |
| | | | | 318/135 |
| 9,031,791 | B2 * | 5/2015 | Nedilko | B61K 9/08 |
| | | | | 702/14 |
| 9,086,430 | B2 * | 7/2015 | Rice | G01M 5/0066 |
| 9,267,862 | B1 * | 2/2016 | Kavars | G01M 5/0008 |
| 10,436,615 | B2 * | 10/2019 | Agarwal | H04L 67/12 |
| 2003/0184445 | A1 * | 10/2003 | Chen | G01V 1/008 |
| | | | | 340/690 |
| 2009/0072964 | A1 * | 3/2009 | Muralidharan | G08B 13/1663 |
| | | | | 340/539.3 |
| 2010/0169021 | A1 | 7/2010 | Moisio | |
| 2012/0038294 | A1 * | 2/2012 | Schulz | F16C 32/0457 |
| | | | | 318/8 |

FOREIGN PATENT DOCUMENTS

| | | | |
|---|---|---|---|
| JP | S56-141575 | A | 11/1981 |
| JP | 2009-68899 | A | 4/2009 |
| JP | 2009-168509 | A | 7/2009 |
| JP | 2013-088314 | A | 5/2013 |
| JP | 2013-108847 | A | 6/2013 |
| JP | 2013-108848 | A | 6/2013 |
| JP | 2014-077645 | A | 5/2014 |
| JP | 2014-134501 | A | 7/2014 |
| KR | 20000049529 | A * | 8/2000 |

OTHER PUBLICATIONS

Alguacil, Gerardo, and Jens Hayskov. "Seismic Accelerometers." Encyclopedia of Earthquake Engineering(2014): 1-18. (Year: 2014).*

The Japanese Office Action (JPOA) dated Dec. 18, 2018 in a counterpart Japanese patent application.

* cited by examiner

SEISMIC SENSOR AND THRESHOLD ADJUSTING METHOD

CROSS-REFERENCE TO RELATED APPLICATION

This application is based on Japanese Patent Application No. 2015-133850 filed with the Japan Patent Office on Jul. 2, 2015, the entire contents of which are incorporated herein by reference.

FIELD

The present invention relates to a seismic sensor and a threshold adjusting method.

BACKGROUND

Conventionally, for example, JP 2014-77645 A proposes a vibration sensing device in which an offset is adjusted. In JP 2014-77645 A, a DC component of the measured vibration data is adjusted to zero by, for example, an adjustable trimmer or digital processing (offset adjustment) to set a trigger level to a proper value. JP 2009-168509 A proposes a vibration warning device in which a user can set a threshold of warning display after startup. In a power device controlling method proposed by JP 2013-088314 A, an average value of vibration acceleration data measured with an acceleration sensor is calculated within a predetermined time, a reference value that is of basic vibration data in a steady state is always calculated by a moving-average method by repeatedly calculating the average value, an earthquake generation determination part compares the reference value calculated with a reference value calculator to the real-time acceleration data measured with the acceleration sensor, and the earthquake is determined when a difference between the real-time acceleration data and the reference value exceeds a predetermined threshold. JP 2013-108847 A proposes a seismometer that monitors whether a noise level exceeds a given threshold, and an abnormal annunciation signal is transmitted to a central control device constituting a seismometer abnormality monitoring system on the assumption that a delay of earthquake detection is generated when the noise level exceeds the threshold. In a technology proposed by JP 2013-108848 A, an initial value of the noise level is repeatedly calculated until becoming a proper value, which is previously fixed as no delay of the earthquake detection.

The seismic sensor in which a microcontroller is used can obtain an index value for evaluating a size of the earthquake through calculation processing, while the power consumption of the seismic sensor tends to increase compared with a conventional mechanical seismic sensor in which a current is passed by the vibration. It is desirable to particularly reduce standby power for a battery-driven device provided in a meter box like the seismic sensor that is used to cut off gas or electricity during the generation of the earthquake. However, depending on an environment where the device is used, the noise is also measured due to passage of a vehicle or construction, and the noises are measured at various levels. The power consumption of the seismic sensor increases when the false detection of the environmental noise is repeatedly generated. The false detection cannot completely be removed only by what is called the offset adjustment.

SUMMARY

An object of the present invention is to suppress the power consumption of the seismic sensor.

A seismic sensor according to one aspect of the present invention is operated in a power-saving mode and a measuring mode in which power consumption is larger than that of the power-saving mode. The seismic sensor includes: a measuring part configured to measure an acceleration; an index calculator configured to transition from the power-saving mode to the measuring mode to calculate an index value indicating a size of an earthquake when the acceleration measured with the measuring part exceeds a first threshold; and a threshold adjuster configured to change the first threshold so as to increase the first threshold relative to a predetermined reference value when a tendency of the acceleration measured with the measuring part satisfies a predetermined condition. In other words, the threshold adjuster changes the first threshold so as to increase an absolute value of a difference between the predetermined reference value and the first threshold.

A frequency at which the measured acceleration exceeds the first threshold increases in a case where the first threshold is inadequate for magnitude of an environmental noise in an installation place of the seismic sensor. Therefore, when the first threshold is changed such that the first threshold relative to the predetermined reference value increases in a case where the tendency of the measured acceleration satisfies the predetermined condition, the first threshold can be adjusted to a more appropriate value. That is, the condition for transition from the power-saving mode to the measuring mode in which the power consumption is larger than that of the power-saving mode is autonomously adjusted to decrease a frequency of startup, which allows the reduction of the power consumption of the seismic sensor.

The predetermined condition may be a case where a frequency at which the acceleration measured with the measuring part exceeds the first threshold exceeds a second threshold. Therefore, the frequency of the transition from the power-saving mode to the measuring mode in which the power consumption is larger than that of the power-saving mode can be decreased.

The seismic sensor may further include an earthquake determination part configured to determine whether the acceleration measured with the measuring part is caused by the earthquake. At this point, the predetermined condition is a case where a frequency at which the earthquake determination part determines that the measured acceleration is caused by the earthquake exceeds a third threshold or a case where a frequency at which the earthquake determination part determines that the measured acceleration is not caused by the earthquake exceeds a fourth threshold. In a case where the seismic sensor detects the earthquake, sometimes the power consumption increases because of pieces of processing such as an evaluation of the size of the earthquake. On the other hand, for the above configuration, the first threshold can be adjusted to a more appropriate value based on the third threshold or fourth threshold that is of a standard for a generation frequency of the earthquake.

The predetermined condition may be a case where the index value is lower than a fifth threshold. Therefore, in a case where the index value is lower than the fifth threshold (that is, the size of the earthquake is lower than the predetermined reference), the frequency of the startup can be decreased.

The threshold adjuster may determine whether the tendency of the acceleration measured with the measuring part satisfies the predetermined condition, when a switch included in the seismic sensor is pressed, when the threshold adjuster receives an instruction from another device connected to the seismic sensor, or at fixed intervals. Therefore, a worker who installs the seismic sensor can adjust the threshold in any timing, or adjust the threshold in conjunction with an automatic self-diagnosis whether the seismic sensor functions.

A threshold adjusting method according to another aspect of the present invention is performed with a seismic sensor that is operated in a power-saving mode and a measuring mode in which power consumption is larger than that of the power-saving mode. Specifically, the threshold adjusting method includes: a measuring step of measuring an acceleration in a predetermined period; an index calculating step of transitioning from the power-saving mode to the measuring mode to calculate an index value indicating a size of an earthquake when the acceleration measured in the measuring step exceeds a first threshold; and a threshold adjusting step of changing the first threshold so as to increase the first threshold relative to a predetermined reference value when a tendency of the acceleration measured in the measuring step satisfies a predetermined condition.

In the threshold adjusting method, the condition for transition from the power-saving mode to the measuring mode is autonomously adjusted to decrease the frequency of the startup, which allows the reduction of the power consumption of the seismic sensor.

Contents described in means for solving the problem can be combined as much as possible without departing from the scope of the present invention.

Accordingly, the power consumption of the seismic sensor can be suppressed.

DETAILED DESCRIPTION

Hereinafter, a seismic sensor according to an embodiment of the present invention will be described with reference to the drawings. The embodiment illustrates an example of the seismic sensor, but seismic sensor of the present invention is not limited to the following configuration.

<Device Configuration>

Figure 1:
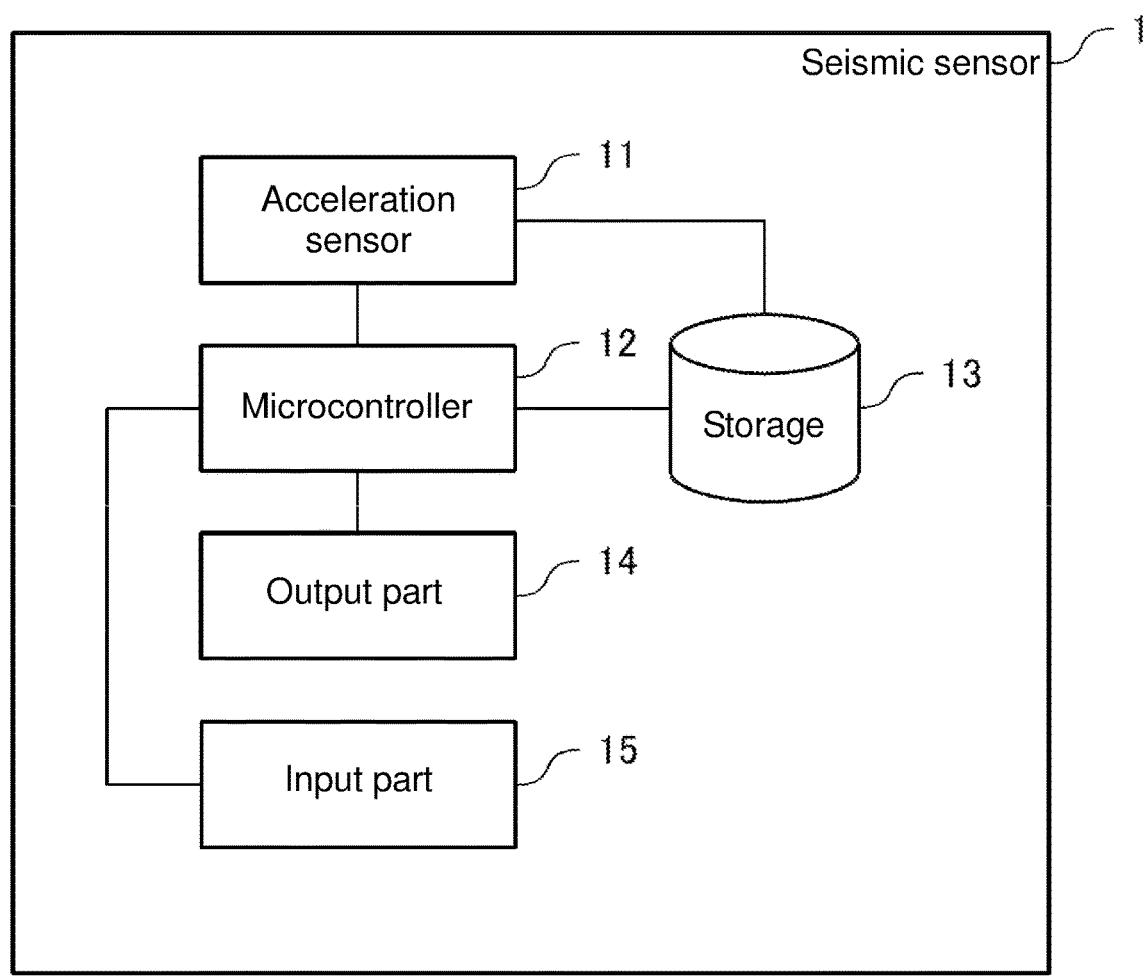
FIG. 1 is a device block diagram illustrating an example of a seismic sensor.

FIG. 1 is a device block diagram illustrating an example of a seismic sensor according to an embodiment. A seismic sensor 1 includes an acceleration sensor 11, a microcontroller 12, a storage 13, an output part 14, and an input part 15. For example, the acceleration sensor 11 is an acceleration sensor in which a piezoelectric element is used or an acceleration sensor that detects an electrostatic capacity between electrodes. An acceleration measured (the measurement is also referred to as "sampling") with the acceleration sensor 11 is output to the microcontroller 12. For example, the microcontroller 12 is a general-purpose integrated circuit. The microcontroller 12 acquires the acceleration measured with the acceleration sensor 11 in a predetermined period, and detects generation of an earthquake or calculates the index value indicating a size of the earthquake, on the basis of the acceleration. The microcontroller 12 is operated in one of an active mode and a sleep mode, which are different from each other, according to a situation. The sleep mode means an operating form in which, the microcontroller 12 is operated while a function is restricted such that the microcontroller 12 stops command execution or clock supply while receiving interrupt, thereby reducing power consumption compared with the active mode. In the active mode, the microcontroller 12 performs determination processing of the earthquake or a noise, and calculates the index value indicating the size of the earthquake. The storage 13 is temporary storage means such as a RAM (Random Access Memory) or a nonvolatile memory such as an EPROM (Erasable Programmable Read Only Memory). For example, the measured acceleration and a threshold used in the earthquake determination are stored in the storage 13. The storage 13 may be a memory incorporated in the acceleration sensor 11 or microcontroller 12. For example, the output part 14 is an output terminal included in the microcontroller 12. For example, when determining that the earthquake is generated, the microcontroller 12 outputs information indicating the generation of the earthquake or the size of the earthquake to another device through the output part 14. The input part 15 is an input terminal included in the microcontroller 12. The microcontroller 12 may receive manipulation of a switch (not illustrated), command input from another device, and the like through the input part 15. A high-pass filter (not illustrated) may be provided between the acceleration sensor 11 and the microcontroller 12 to remove a gravitational component. The microcontroller 12 may deal with the acceleration measured with the acceleration sensor 11 while converting the acceleration into an absolute value of the acceleration based on a predetermined offset.

<Functional Configuration>

Figure 2:
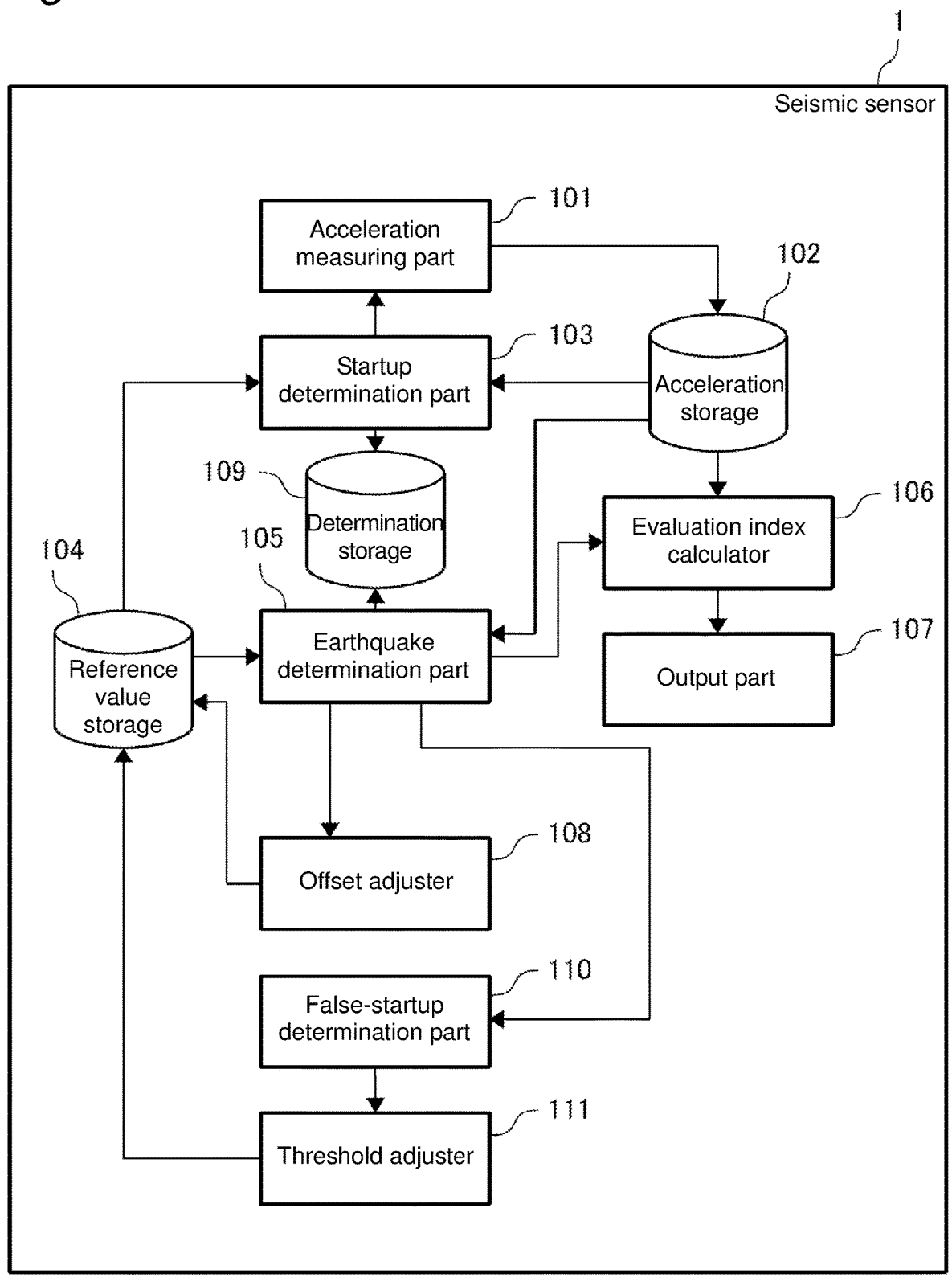
FIG. 2 is a functional block diagram illustrating an example of the seismic sensor.

FIG. 2 is a functional block diagram illustrating an example of the seismic sensor 1. The seismic sensor 1 includes an acceleration measuring part 101, an acceleration storage 102, a startup determination part 103, a reference value storage 104, an earthquake determination part 105, an evaluation index calculator 106, an output part 107, an offset adjuster 108, a determination storage 109, a false-startup determination part 110, and a threshold adjuster 111. The acceleration sensor 11 and microcontroller 12 in FIG. 1 are operated on the basis of a predetermined program, thereby implementing the acceleration measuring part 101, the startup determination part 103, the earthquake determination part 105, the evaluation index calculator 106, the offset adjuster 108, the false-startup determination part 110, and the threshold adjuster 111. The acceleration storage 102, the reference value storage 104, and the determination storage 109 are constructed with the storage 13 in FIG. 1. The microcontroller 12 is operated in the active mode to implement at least the earthquake determination part 105 and the evaluation index calculator 106. The microcontroller 12 and output part 14 in FIG. 1 are operated on the basis of the predetermined program to implement the output part 107.

The acceleration measuring part 101 measures the acceleration in a setting period. Usually the acceleration measuring part 101 repeatedly measures the acceleration at a relatively low speed (that is, relatively long measurement period, also referred to as a "first period"). For the low-speed sampling, basically the microcontroller 12 is operated in the sleep mode. The operating state having the small power consumption is referred to as a "power-saving mode" or a "standby state". In other words, the power-saving mode is an operating state in which the low-speed sampling is performed. At this point, the power consumption is suppressed because the microcontroller 12 is operated in the sleep mode in which the function is restricted. When detecting the vibration larger than a threshold previously set to the reference value storage 104, the acceleration measuring part 101 repeatedly measures the acceleration at a speed higher than that of the low-speed sampling (that is, relatively short measurement period, also referred to as a "second period"). For the high-speed sampling, the microcontroller 12 is also operated in the sleep mode. Additionally, the microcontroller 12 is operated in the active mode when the earthquake determination part 105 or the evaluation index calculator 106 performs processing. The operating state is also referred to as a "measuring mode", and a transition of the operating state from the power-saving mode to the measuring mode is also referred to as "startup". In other words, the measuring mode is an operating state in which the high-speed sampling is performed. At this point, sometimes the microcontroller 12 is operated in the sleep mode in which the function is restricted, and sometimes the microcontroller 12 is operated in the active mode in which the microcontroller 12 can be operated with the maximum calculating capability. In the measuring mode, the microcontroller 12 switches from the sleep mode to the active mode, thereby increasing the power consumption compared with the power-saving mode.

The acceleration measured with the acceleration measuring part 101 is stored in the acceleration storage 102. The startup determination part 103 compares the acceleration measured with the acceleration measuring part 101 to a startup threshold stored in the reference value storage 104, and switches the operating state from the power-saving mode to the measuring mode when the measured acceleration exceeds the startup threshold. The earthquake determination part 105 determines whether the measured acceleration indicates the earthquake or a noise using the acceleration measured with the acceleration measuring part 101 and the threshold previously set in the reference value storage 104.

When the earthquake determination part 105 determines that the measured acceleration indicates the earthquake, the evaluation index calculator 106 calculates an evaluation index indicating the size of the earthquake. For example, it is assumed that an SI (Spectrum Intensity) value is calculated as the earthquake evaluation index. The output part 107 outputs the calculated SI value to an external device.

Figure 3A:
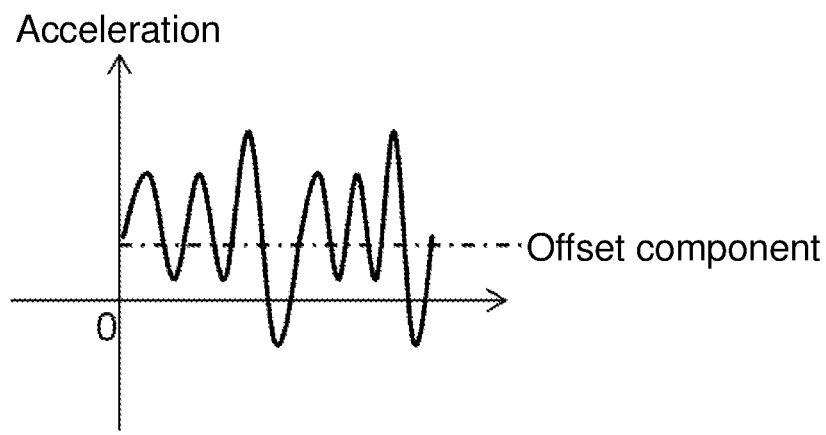
FIGS. 3A to 3C are views illustrating an acceleration measured in an embodiment and a threshold.
Figure 3B:
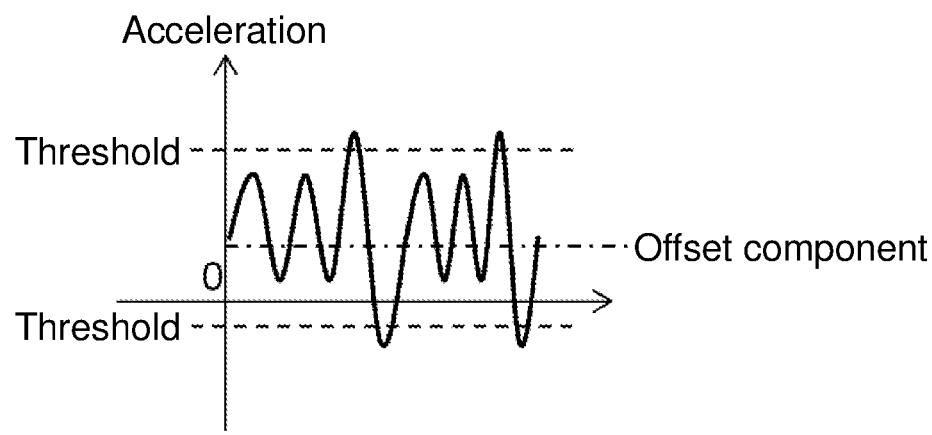
Figure 3C:
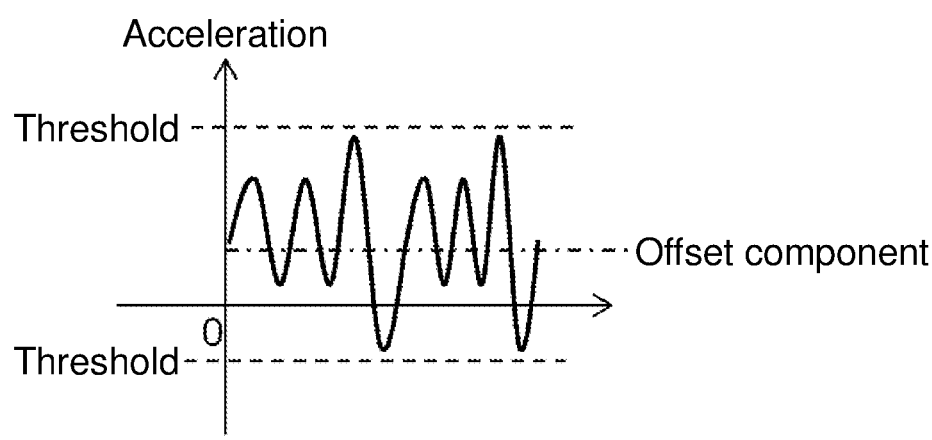

On the other hand, when the earthquake determination part 105 determines that the measured acceleration indicates the noise, the offset adjuster 108 performs what is called an offset adjustment. In the embodiment, an environmental noise component in the state in which the vibration caused by the earthquake is not generated is referred to as an offset component. The environmental noise component is included in the measured acceleration. For example, the offset adjuster 108 calculates a median of the maximum and minimum values of the acceleration determined to be the noise or an average value of the acceleration as the offset component. FIGS. 3A to 3C illustrate the acceleration measured in the embodiment and the threshold. In FIGS. 3A to 3C, the vertical axis indicates the acceleration, and the horizontal axis indicates time. In a case where the vibration indicated by a thick solid line is measured as illustrated in FIG. 3A, the offset component can be obtained as the average value of the acceleration indicated by an alternate long and short dash line. The calculated offset component is stored in the reference value storage 104, and used in the startup determination made by the startup determination part 103 and the earthquake determination made by the earthquake determination part 105.

For example, after the startup or the calculation of the evaluation index, the earthquake determination part 105 starts up a timer to count elapsed time. The false-startup determination part 110 determines whether the startup or the calculation of the evaluation index is performed at least the predetermined number of times in a predetermined period. When the startup or the calculation of the evaluation index is performed at least the predetermined number of times in a predetermined period (that is, when the determination of the earthquake is made), the threshold adjuster 111 adjusts the threshold relative to the offset component. In a case where the vibration indicated by the thick solid line is measured as illustrated in FIG. 3B, the threshold is defined as a value relative to the offset component as indicated by a broken line. At this point, in a case where a frequency of the startup caused by the noise (that is, false startup) is larger than or equal to a predetermined value even after the offset adjustment, the threshold relative to the offset component can be determined to be inadequate with respect to the environmental noise in an installation place of the seismic sensor. Accordingly, as illustrated in FIG. 3C, the threshold that is defined as a difference relative to the offset component is widened by predetermined magnitude. For example, a value in which a half of the difference between the maximum and minimum values obtained by measuring the acceleration in the predetermined period is added to and subtracted from the offset component is used as the threshold, which allows the threshold to be widened. In other words, the threshold is changed so as to increase relative to the offset component (that is, the "reference value"). That is, the threshold is changed such that an absolute value of the difference between the offset component and the threshold increases. The threshold is set to a proper level by repeating the adjustment of the threshold. The adjusted threshold is stored in the reference value storage 104, and used in the startup determination made by the startup determination part 103 and the earthquake determination made by the earthquake determination part 105.

<Seismic Processing>

Figure 4:
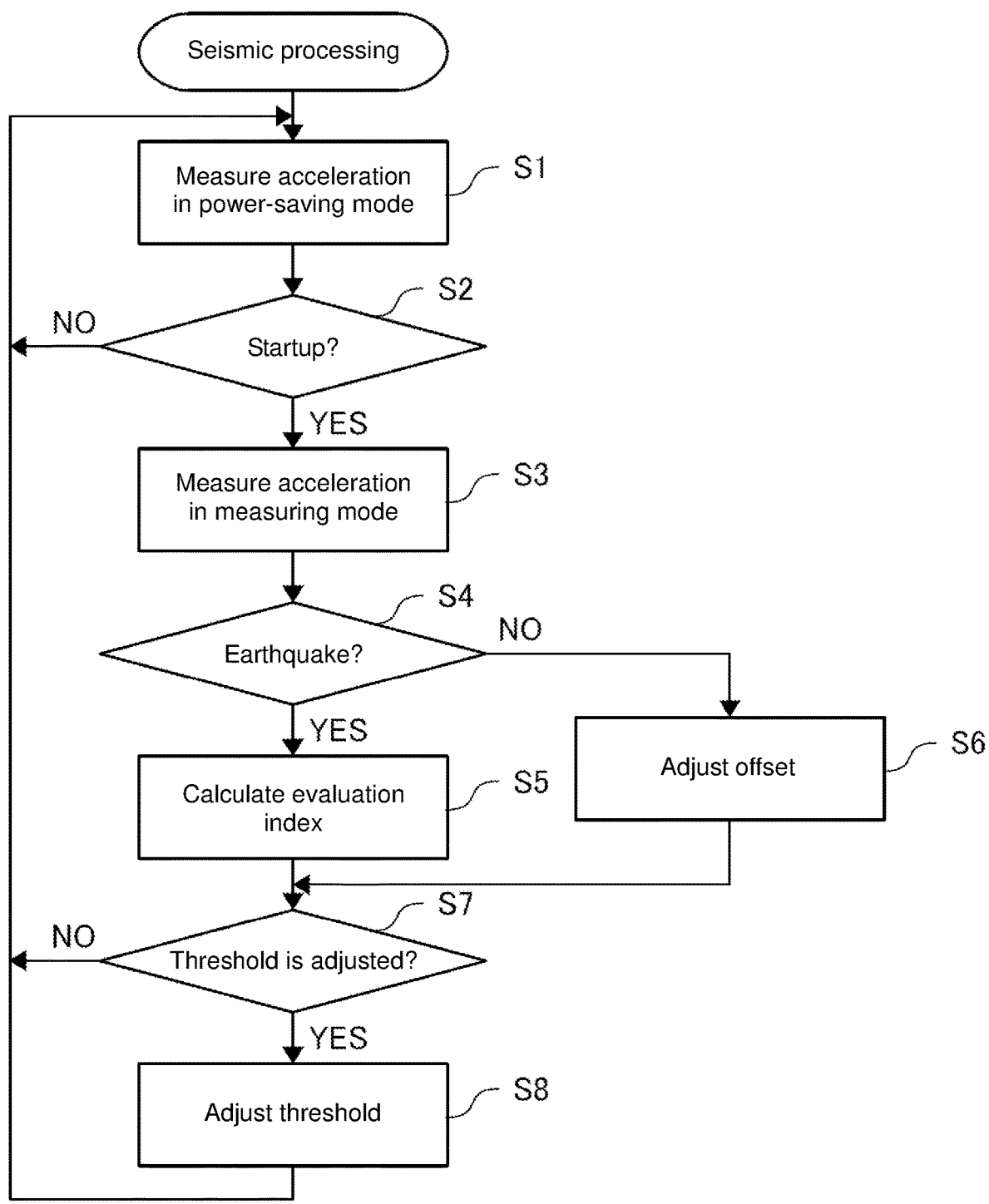
FIG. 4 is a flowchart illustrating an example of seismic processing.

FIG. 4 is a flowchart illustrating an example of the seismic processing. The acceleration measuring part 101 of the seismic sensor 1 measures the acceleration in the power-saving mode (S1 in FIG. 4). The acceleration measuring part 101 performs the low-speed sampling in the power-saving mode. The startup determination part 103 of the seismic sensor 1 determines whether the startup is performed (that is, whether the transition to the measuring mode is made) (S2). For example, when the acceleration measured in S1 is less than or equal to the threshold (startup threshold, for example, 50 gal) in FIGS. 3A to 3C (NO in S2), the processing returns to S1 to continue the power-saving mode (low-speed sampling). On the other hand, when the acceleration measured in S1 is greater than the threshold in FIGS. 3A to 3C (YES in S2), the acceleration measuring part 101 transitions to the measuring mode. As illustrated in FIG. 3C, the startup threshold is the relative value relative to the offset. The acceleration measuring part 101 performs the high-speed sampling in the measuring mode. The startup determination part 103 adds the number of startup times in the predetermined period in each time of the startup. In a case where the timer that counts the elapsed time is stopped, the timer is caused to start the counting of the elapsed time, and the number of startup times in the predetermined period may be counted to obtain the frequency.

Then, the acceleration measuring part 101 measures the acceleration by the high-speed sampling in the measuring mode, and stores the measured acceleration in the acceleration storage 102 (S3). The earthquake determination part 105 of the seismic sensor 1 makes the earthquake determination (that is, the noise determination) (S4). In making the earthquake determination, the operation of the microcontroller 12 transitions from the sleep mode to the active mode. In S4, whether the detected vibration is caused by the earthquake or the noise is determined. For example, the determination that the vibration measured in S1 is caused by not the earthquake but the noise is made unless the vibration is continued for at least predetermined time. Specifically, in order that the noise is not falsely detected as the earthquake by one-time peak acceleration measured in S1, the earthquake determination part 105 determines that the vibration is caused by the earthquake when the acceleration larger than a predetermined threshold (earthquake determination threshold, for example, 100 gal) is continuously detected in plural samples that are sampled at high speed in the predetermined period (for example, 3 seconds). For example, the difference between the maximum and minimum values of the measured values in the predetermined period, the average value of the measured values, or a sum of the average value and a variance (or a standard deviation) of the measured values are obtained. The vibration may be determined to be the earthquake in a case where the obtained value is larger than the earthquake determination threshold. In a case where the sum of the average value and the variance (or the standard deviation) is adopted, a value obtained by multiplying the standard deviation a by a predetermined coefficient may be dealt with as the variance. The value used in the determination whether the vibration is caused by the earthquake or the noise is not limited to the above example, but the value may be the maximum value of the measured value, the minimum value of the measured value, the average value of the measured values, the variance (standard deviation) of the measured values, or a value combined by addition, subtraction, multiplication, and division of at least two values. The vibration is determined to be the earthquake when there is a magnitude correlation between these values and the earthquake determination threshold. Although preferably the earthquake determination threshold used in S4 is different from the startup threshold, the earthquake determination threshold may be identical to the startup threshold.

When the detected vibration is caused by the earthquake (YES in S4), the evaluation index calculator 106 of the seismic sensor 1 calculates the evaluation index indicating the size of the earthquake (S5). During the calculation of the evaluation index, the microcontroller 12 is operated in the active mode. For example, the SI value is obtained in S5. The SI value is an example of the earthquake evaluation index, and is a value in which a correlation with an extent of damage of a building is acknowledged. The output part 107 of the seismic sensor 1 outputs the calculated evaluation index to another device. Specifically, the SI value can be obtained by Mathematical formula 1.

$$SI = \frac{1}{2.4} \int_{0.1}^{2.5} Sv(T, h) dT \qquad \text{[Mathematical formula 1]}$$

The SI value is an index expressing a destructive power of earthquake motion in terms of an average of speed response spectrum integrated values for 0.1 to 2.5 seconds that is of a unique period of a high-rigidity structure. In this formula, Sv is a speed response spectrum, T is a period, and h is an attenuation constant. When determining that the detected vibration is caused by the earthquake (that is, in a case where the evaluation index is calculated), the earthquake determination part 105 causes the timer to count the elapsed time, and counts the number of earthquake determination times (that is, the frequency) in the predetermined period.

On the other hand, when the detected vibration is not caused by the earthquake (NO in S4), the offset adjuster 108 of the seismic sensor 1 adjusts the offset (S6). In S4, the average value of the acceleration indicated by the alternate long and short dash line in FIG. 3A is obtained as the offset. Thus, the reference of the threshold is adjusted.

For the high startup frequency after S5 or S6, the false-startup determination part 110 of the seismic sensor 1 causes the threshold adjuster 111 to adjust the startup threshold (S7). Specifically, the threshold adjuster 111 determines that the threshold is adjusted (YES in S7) in a case where the number of times of the transition to the high-speed sampling within the predetermined time, the number of calculation times of the evaluation index within the predetermined time, or the number of times of the determination that the vibration is caused by not the earthquake but the noise within the predetermined time exceeds a given value.

The threshold adjuster 111 adjusts the threshold that is of a standard for the startup determination and earthquake determination (S8). In S8, using the value measured in S3 in the predetermined period, the threshold adjuster 111 changes the threshold such that the threshold relative to the reference value (acceleration offset) increases. For example, the threshold adjuster 111 decides a new threshold based on the difference between the maximum and minimum values of the measured accelerations, the average value of the measured accelerations, or the sum of the average value and variance of the measured accelerations. Specifically, the threshold may be changed so as to increase relative to the offset component. For example, the value in which a half of the difference between the maximum and minimum values obtained by measuring the acceleration in the predetermined period is set to a target value of the threshold. A given ratio of a difference between the target value and the current threshold is set to magnitude changed by the one-time adjustment, and threshold is repeatedly adjusted, whereby the threshold converges gradually on a proper value. Assuming that a is a standard deviation with respect to a variance in a certain period, $(4 \times \sigma)$ may be set to the threshold. Therefore, the startup caused by the noise can be suppressed in a case where the noise component following a normal distribution is detected.

<Effect>

In the embodiment, not only the initial setting of the startup threshold can initially be set according to the environment in which the seismic sensor is installed, but also the seismic sensor can autonomously adjust the startup threshold even if the noise is detected by the environmental change, such as a start of the construction and a temperature drift, after the installation of the seismic sensor. The startup frequency can properly be set by the adjustment of the startup threshold, and the power consumption of the seismic sensor can be suppressed. The necessity of the setting in each environment is eliminated in seismic sensor installation work, which leads to the reduction of the installation cost. In the modification, the threshold is not adjusted when the startup is not performed even if the acceleration exceeding the startup threshold is detected. That is, because the threshold is not adjusted when the startup threshold is properly set, the high power consumption suppressing effect is obtained compared with the mode in which the threshold is periodically adjusted.

<Modifications>

In the flowchart of FIG. 4, the offset needs not to be dynamically adjusted (for example, S4 and S6). In this case, the threshold is changed while the reference value of the acceleration is set to zero. Even in this case, the threshold can autonomously be adjusted in order to perform the startup from the standby state, and the power consumption of the seismic sensor can be reduced.

An upper limit may be provided in the threshold adjusted in S8. This prevents the infinite change of the threshold that the earthquake to be detected cannot be detected.

The threshold adjustment in S8 may be performed with another condition as a trigger in addition to the timing in FIG. 4. For example, a switch is connected to the input part 15 in FIG. 1, and a worker may press the switch in the seismic sensor installation work to adjust the threshold. An interface for another computer is connected to the input part 15 in FIG. 1, and the threshold may be adjusted when a command is input from the computer. The threshold may be adjusted in conjunction with periodic processing such as a self-diagnosis performed by the seismic sensor. For example, when the evaluation index calculated in S5 is determined to be smaller than the threshold indicating a predetermined size, the threshold (startup threshold) may be adjusted in S8.

In S8, by way of example, the threshold is adjusted so as to increase. A scene in which the threshold is adjusted so as to decrease is also considered like a case where the construction in the neighborhood is completed. For example, update processing of bringing the threshold close to the initial value may periodically be performed. The magnitude of the threshold may arbitrarily be changed. Processing of returning the threshold to the initial value (that is, reset) may periodically be performed. Input of a command to change the threshold may be received from another computer connected to the seismic sensor through the input part 15 in FIG. 1. The threshold may be changed in conjunction with the periodic processing such as the self-diagnosis performed by the seismic sensor.

During the threshold adjustment in S8, the sampling period and sampling time of the acceleration may be set independently of the acceleration measured in S3. In measuring the vibration noise, sometimes it is preferable to adopt a high sampling speed higher than the sampling condition necessary for the calculation of the evaluation index of the earthquake.

On the other hand, during the threshold adjustment in S8, the sampling may be performed by the same condition as the acceleration measurement in S3. In this case, the threshold used to determine the earthquake in S4 may be set to the same value as the threshold adjusted in S8.

The threshold adjusted in S8 may be decided on the basis of a result of the threshold adjustment processing for the last predetermined number of times. For example, the setting value is gently changed when the average value of the thresholds for the last predetermined number of times is adopted.

In S5, not only the output part 107 directly outputs the evaluation index, but also the output part 107 may generate a predetermined pulse pattern or output a binary signal such as on/off and high/low to notify an external device of the generation of the earthquake larger than a predetermined size in a case where evaluation index is larger than the predetermined threshold. Whether the seismic sensor 1 outputs the evaluation index or the pulse pattern is switched by the setting, which allows the provision of the seismic sensor compatible with the conventional device.

The invention claimed is:

1. A seismic sensor operated in a power-saving mode and a measuring mode in which power consumption is larger than that of the power-saving mode, the seismic sensor comprising:
   a processor configured with a program to perform operations comprising:
      operation as a measuring part configured to measure an acceleration with low-speed sampling in the power-saving mode and with high-speed sampling in the power-saving mode and in the measuring mode in response to the acceleration being larger than a reference threshold;
      operation as an index calculator configured to transition from the power-saving mode to the measuring mode to calculate an index value indicating a size of an earthquake in response to the acceleration measured with the measuring part in the measuring mode continuously exceeding a first threshold in a plurality of samples measured with the high-speed sampling in a predetermined period; and
      operation as a threshold adjuster configured to change the first threshold so as to increase the first threshold relative to a predetermined reference value in response to a predetermined condition in which the acceleration measured with the measuring part in the measuring mode is determined to be caused by other than the earthquake unless the acceleration measured continuously exceeds the first threshold in the plurality of samples measured in the predetermined period.

2. The seismic sensor according to claim 1, wherein the predetermined condition further comprises a condition in which a frequency at which the acceleration measured with the measuring part exceeds the first threshold exceeds a second threshold.

3. The seismic sensor according to claim 1, wherein:
   the processor is configured with the program to perform operations further comprising operation as an earthquake determination part configured to determine whether the acceleration measured with the measuring part with the high-speed sampling in the measuring mode is caused by the earthquake; and
   the predetermined condition further comprises a condition in which a frequency at which the earthquake determination part determines that the acceleration measured is caused by the earthquake exceeds a third threshold or a condition in which a frequency at which the earthquake determination part determines that the acceleration measured is not caused by the earthquake exceeds a fourth threshold.

4. The seismic sensor according to claim 1, wherein the predetermined condition further comprises a condition in which the index value is lower than a fifth threshold.

5. The seismic sensor according to claim 1, wherein the processor is configured with the program to perform operations such that the threshold adjuster determines whether the acceleration measured with the measuring part with the high-speed sampling in the measuring mode fails to exceed the first threshold in the predetermined period, in response to: a switch included in the seismic sensor being pressed; the processor being configured with the program to perform operations such that the threshold adjuster receives an instruction from another device connected to the seismic sensor; or at fixed intervals.

6. A threshold adjusting method performed with a seismic sensor operated in a power-saving mode and a measuring mode in which power consumption is larger than that of the power-saving mode, the threshold adjusting method comprising:

measuring an acceleration with a low-speed sampling in the power-saving mode and with a high-speed sampling in the power-saving mode in response to the acceleration being larger than a reference threshold;

transitioning from the power-saving mode to the measuring mode to calculate an index value indicating a size of an earthquake in response to the acceleration measured in the measuring mode continuously exceeding a first threshold at least a in a plurality of samples measured with the high-speed sampling in a predetermined period; and changing the first threshold so as to increase the first threshold relative to a predetermined reference value in response to a predetermined condition in which the acceleration measured in the measuring mode is determined to be caused by other than the earthquake unless the acceleration measured continuously exceeds the first threshold the in the plurality of samples measured in the predetermined period.

7. The seismic sensor according to claim 1, wherein the processor is configured with the program to perform operations such that operation as the threshold adjuster comprises periodically changing the first threshold to decrease the first threshold relative to the predetermined reference value.

8. The seismic sensor according to claim 1, wherein the processor is configured with the program to perform operations such that operation as the threshold adjuster comprises periodically changing the first threshold to reset the first threshold to an initial value.

* * * * *